Oct. 22, 1963

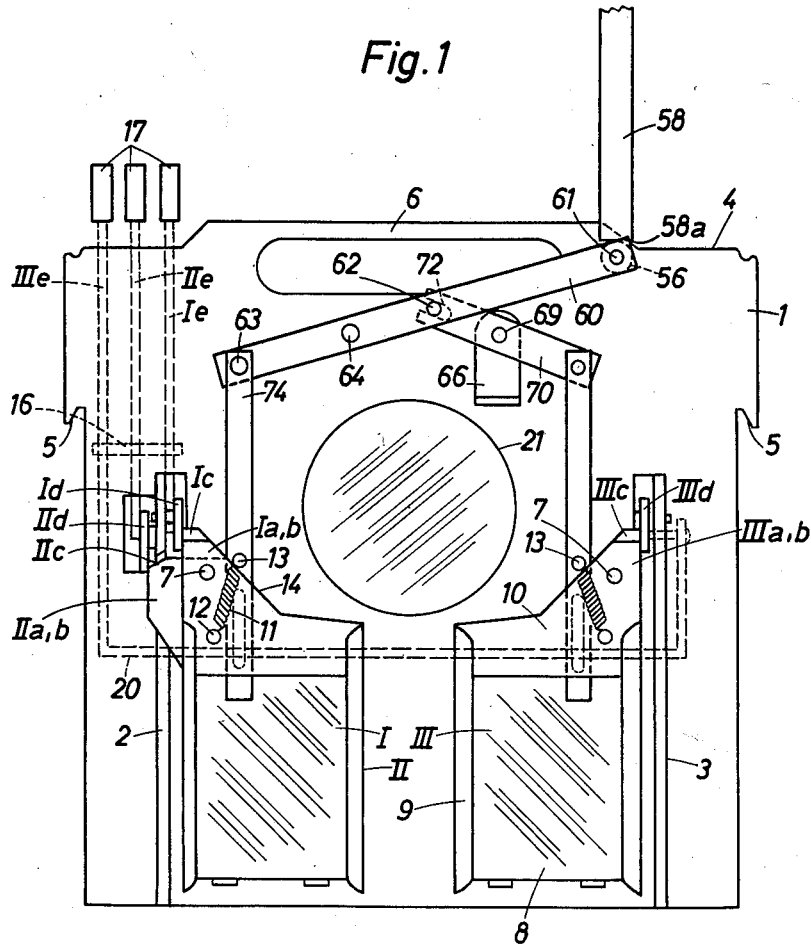
Oct. 22, 1963     G. ENGELAGE     3,107,578
FILTER-OPERATING ARRANGEMENT FOR A PHOTOGRAPHIC PRINTING APPARATUS
Filed Nov. 23, 1960     9 Sheets-Sheet 1
INVENTOR:
GÜNTHER ENGELAGE
BY Connolly and Hutz
ATTORNEYS Oct. 22, 1963    G. ENGELAGE    3,107,578
FILTER-OPERATING ARRANGEMENT FOR A PHOTOGRAPHIC
PRINTING APPARATUS
Filed Nov. 23, 1960    9 Sheets-Sheet 2
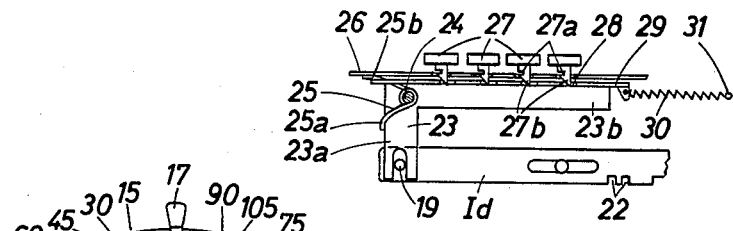
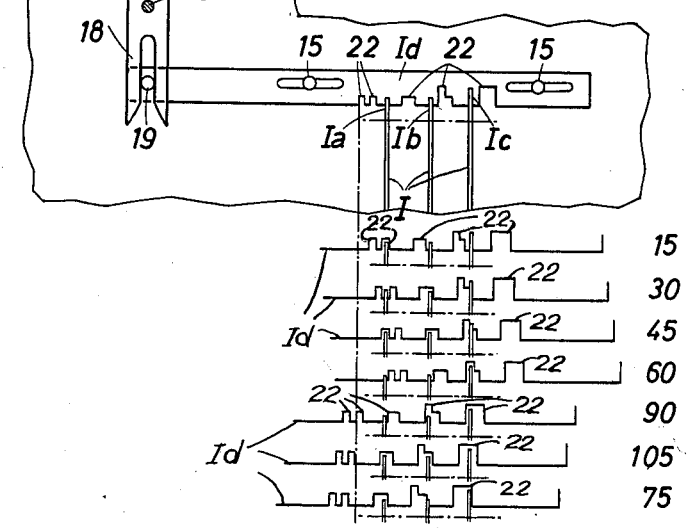
INVENTOR:
GÜNTHER ENGELAGE
BY Connolly and Hutz
ATTORNEYS

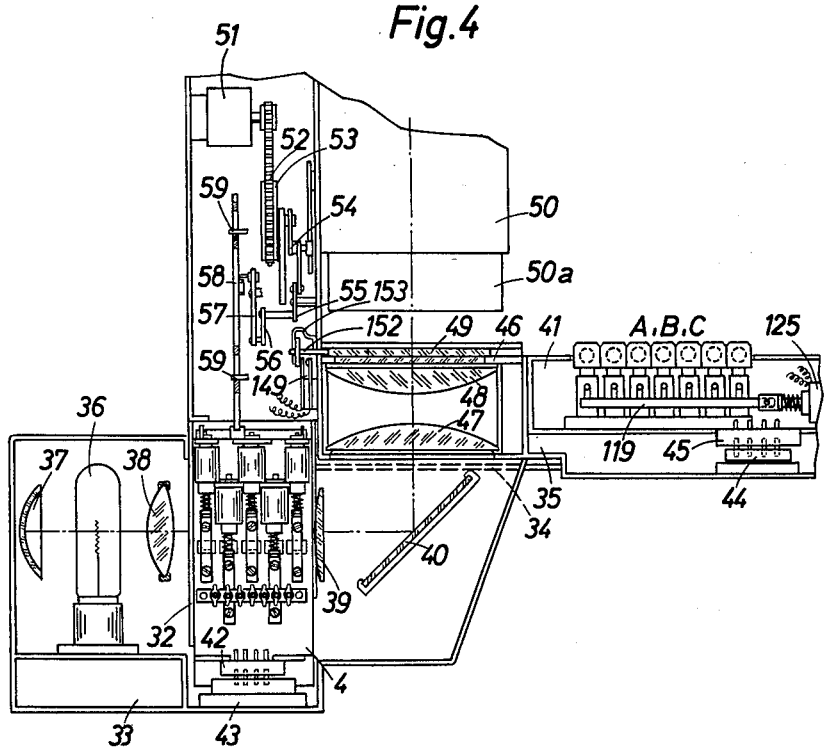

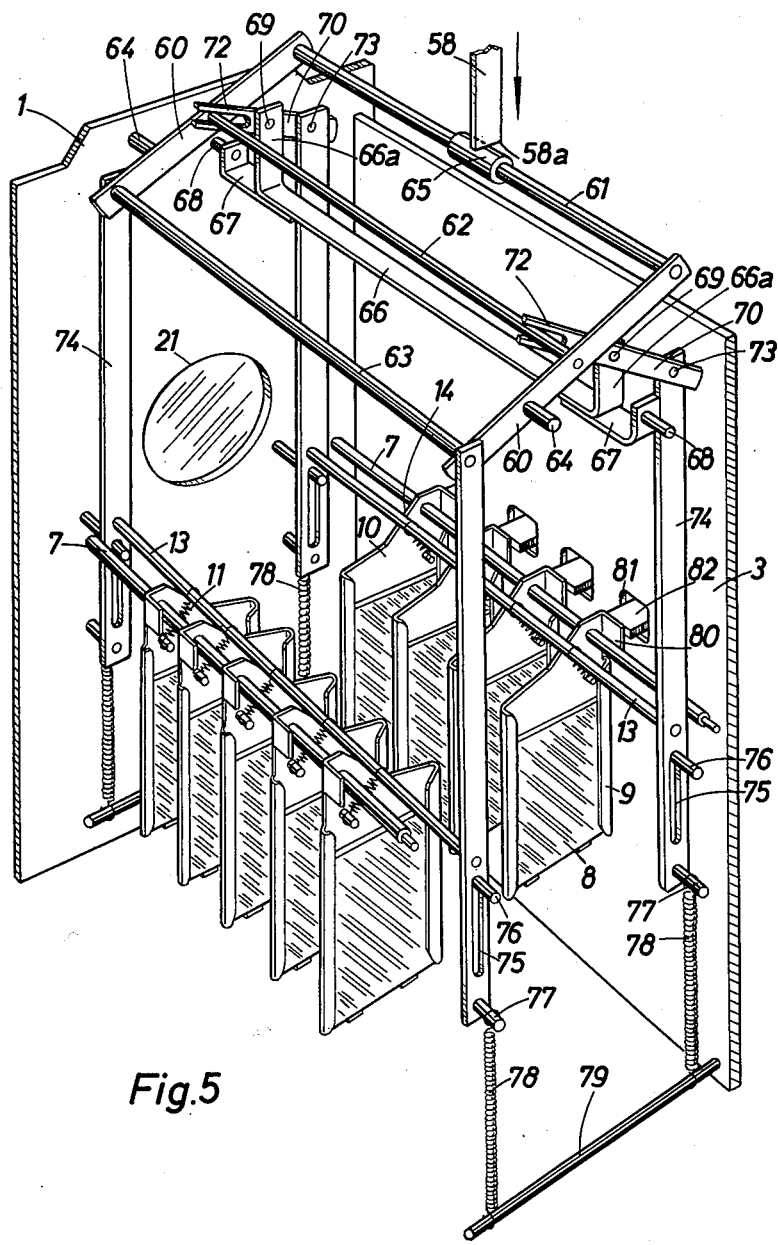

G. ENGELAGE 3,107,578

FILTER-OPERATING ARRANGEMENT FOR A PHOTOGRAPHIC PRINTING APPARATUS

Filed Nov. 23, 1960

INVENTOR:
GÜNTHER ENGELAGE
BY
Connolly and Hutz
ATTORNEYS

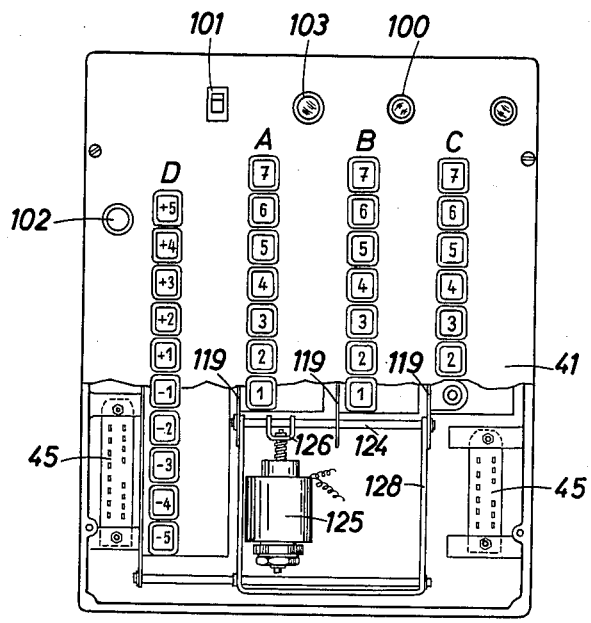

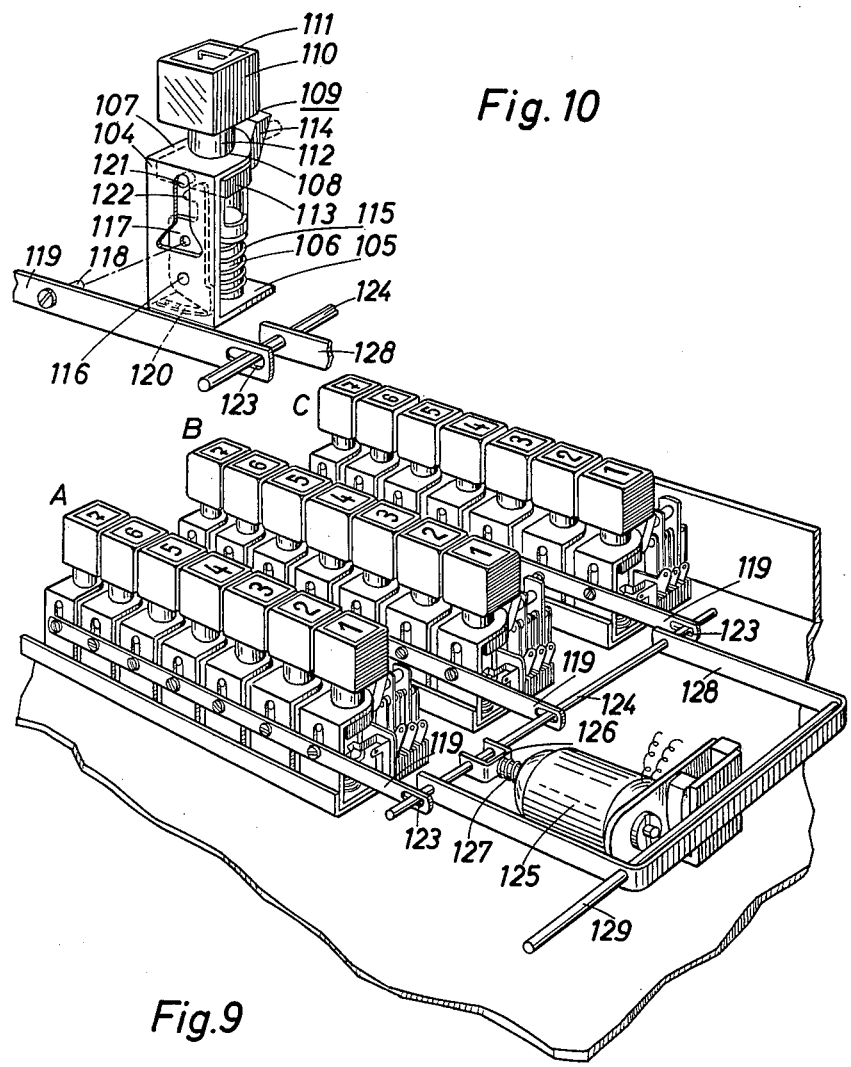

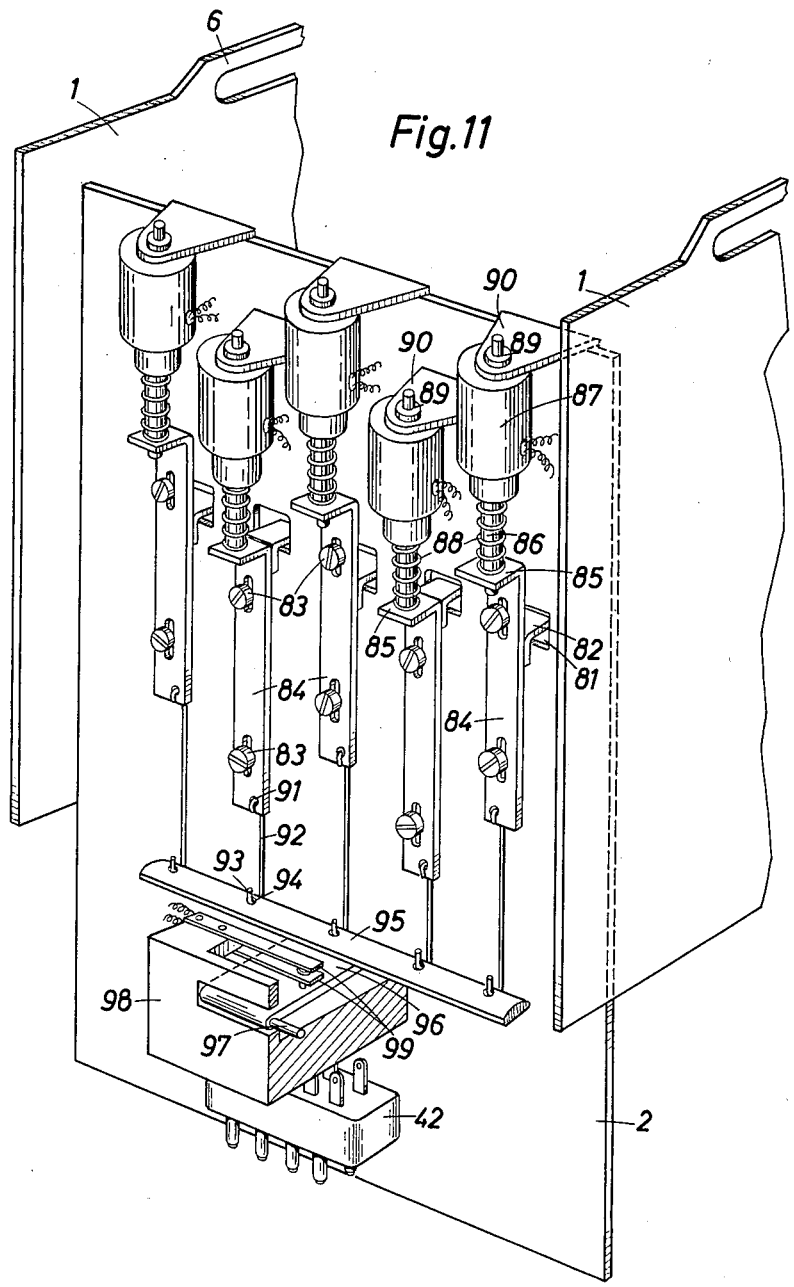

United States Patent Office

3,107,578
Patented Oct. 22, 1963

3,107,578
FILTER-OPERATING ARRANGEMENT FOR A PHOTOGRAPHIC PRINTING APPARATUS
Günther Engelage, Unterhaching, near Munich, Germany, assignor to Agfa Aktiengesellschaft, Leverkusen-Bayerwerk, Germany, a corporation of Germany
Filed Nov. 23, 1960, Ser. No. 71,272
Claims priority, application Germany Dec. 5, 1959
20 Claims. (Cl. 88—24)

This invention relates to an arrangement for controlling interposition of filters into the path of the printing light rays in a photographic printing apparatus, and it more particularly relates to such an arrangement in which color filters of varying density for each color component are selectively actuated either individually or in groups.

The expression color components is used herein to represent the subtractive components blue-green, purple and yellow, for controlling the basic additive primary colors red, green and blue. These subtractive components are also known as cyan, magenta and yellow.

The filter density values described in the following are related to a standard filter factor of 100 which is arbitrarily assigned to a combination of the three subtractive cyan, magenta and yellow filters which together absorb 90% of white light and pass only a neutral gray. Other filters having lesser or greater degrees of absorption are assigned filter factors which are related to this arbitrary standard.

Various types of mechanical and electrical drives have been used for controlling the interposition of filters used in conjunction with photographic printing apparatus into the path of the rays of the printing light. Fairly high operating speeds for these filters have been achieved by arrangements in which all of the filters are pivoted upon a single axis of rotation and directly coupled with driving solenoids. The operation of these solenoids is controlled by a punched tape which is scanned by electrical contact patterns. These solenoids are quite strong and large and require more space than is usually available in normal photographic printing apparatus. Furthermore, their working stroke is quite strong thereby requiring their operating strokes to be absorbed by specially cushioned arresting members. The ultimate structure is, therefore, quite complicated and expensive.

An object of this invention is to provide an arrangement for controlling the interposition of filters into the path of the rays of printing light in a photographic printing apparatus which is compact, simple and economical in structure, and quick in operation without requiring elaborate cushioning devices.

In accordance with this invention a number of filter elements of varying density for each of the subtractive color components are movably mounted adjacent the path of the rays of printing light in a photographic printing apparatus. A resilient means reacts against each of these elements to move in a direction to insert them into the path of the rays of the printing light. However, a releasable locking means is associated with each of these elements to maintain them normally locked out of the path of the rays of printing light. This locking means is arranged to selectively release one or more color filters for each component in various predetermined combinations. One releasable locking element may, for example, be provided for the filters of varying density of each color component to provide three locking elements in all. This releasable locking means can be made in various forms, such as, a notched sliding rod, a cam shaft, a rotatable shaft carrying a number of locking attachments or as a pivoted plate. This releasable locking means is preferably made as a movable rod which is mounted to slide across the planes of movement of the various filter elements. This sliding rod may, for example, be made in the form of a stamped sheet metal slide. This slide is notched or cut out in a pattern which releases predetermined combinations of filters at each of its operative stations which are designated by predetermined filter factor values. The remaining filters having factors not then being used are maintained in engagement with the releasable locking means and thereby maintained outside of the path of the light rays against the bias of their driving springs.

In accordance with another aspect of this invention the filter elements, the releasable locking means and a drive for energizing the resilient means are all incorporated within a unitary assembly which is detachably mounted upon the printing apparatus. An energizing means is connected through a clutch with a driving element of the printing apparatus for causing the filter elements to be biased toward the path of the printing light rays only during a predetermined portion of the operating cycle of the printing apparatus. This unitary structure and its detachable mounting is made possible by the inherently compact structure of the aforementioned elements. This greatly simplifies the mounting of this arrangement upon a photographic printing apparatus and also facilitates the removal and replacement of the filter assembly if this is required.

In accordance with a further electrically-operated embodiment of this invention the releasable locking means incorporates solenoids, which are remotely actuated from a switch assembly remotely mounted upon the printing apparatus. These solenoids need only operate the releasable locking means instead of the filter elements themselves. The frictional resistance of this locking means is quite small in comparison with the frictional resistance of the filter elements themselves, and the size and expense of the operating solenoids are accordingly greatly minimized by associating them with the locking means. The operating switches for the solenoids can be conveniently positioned upon the printing apparatus in a position most convenient for the operator. These switches are preferably of the push button type, and they incorporate one or more contacts for controlling the locking solenoids of the filters that they operate. It is accordingly also advantageous to provide a common locking linkage for all of the push buttons of one color component which holds the last operated push button or push buttons depressed and releases any other push button previously depressed. The locking linkages for all of the color components may be connected through coupling linkages with a single release device which may be operated by a solenoid. Even though combinations of filters having different factors for each color component can be individually selected, the "off" position for all of the buttons can thereby be restored by simultaneous operation of all of the release elements by the release solenoid. This permits all of the filter elements to be quickly removed from the path of the light rays before the printing of each new transparency in one single operation.

Even this single operation may be automatically controlled by arranging an operating switch for the release solenoid in accordance with this invention in the path of movement of the transparency to be printed or a part of it such as its frame. When the transparency is inserted into the printing position, this switch is opened to permit the locking linkages to engage the depressed push buttons and permit the filter combinations required for the inserted transparency to be set. As soon as the transparency is removed from the printing position at the end of the exposure either by hand or automatically, a spring closes the switch which automatically unlocks all of the push buttons to prepare for actuating those which control the interposition of the filters that the next transparency requires.

In accordance with still another aspect of this invention a warning device is provided for signaling if any of the filters or releasable locking means have not been returned to their proper starting condition. This warning device may incorporate parallel-connected switches which are operatively connected to the elements in question for providing signals of either an optical or acoustic nature if any of them are not in their proper starting position. These warning devices are disconnected or by-passed during the printing process to prevent the transmission of any disturbing signals while the filter elements are being used.

Novel features and advantages of the present invention will become apparent to one skilled in the art from a reading of the following description in conjunction with the accompanying drawings wherein similar reference characters refer to similar parts and in which:

FIG. 1 is a view in elevation taken along a section cut through one embodiment of this invention;

FIG. 2 is a view in elevation taken through a portion of the embodiment shown in FIG. 1 together with diagrammatic representations of various phases of operation;

FIG. 3 is a view in elevation of a modification of the portion of the embodiment shown in FIG. 2;

FIG. 4 is a cross-sectional view in elevation of one embodiment of this invention as it is installed upon a photographic printing apparatus;

FIG. 5 is a perspective view of an electrically-controlled embodiment of this invention;

FIG. 8 is a plan view partially broken away in cross section of a switching arrangement for an electrically-controlled embodiment of this invention;

FIG. 9 is a perspective view of internal portions of the switching arrangement shown in FIG. 8;

FIG. 10 is an enlarged perspective view of a portion of FIG. 9;

FIG. 11 is a perspective view of a solenoid-actuated portion of the electrically-controlled embodiment of this invention shown in FIG. 6.

Figure 6:
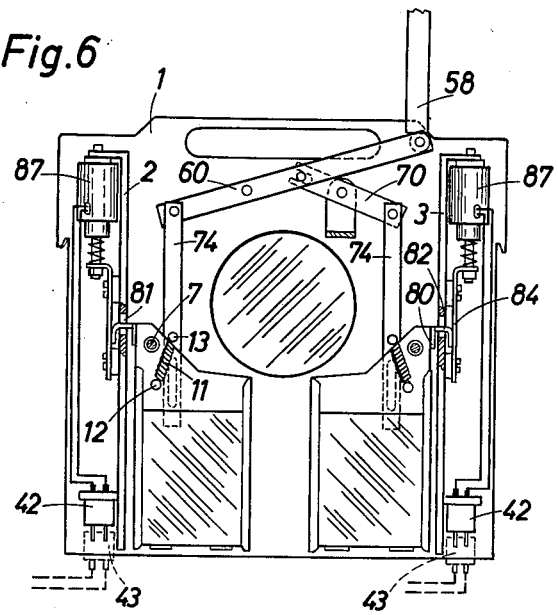
FIGS. 6 and 7 are views in elevation of the embodiment shown in FIG. 6 in two different phases of operation.

In FIG. 1 is shown a filter assembly 4 in accordance with this invention having front and rear walls of which only the front wall 1 and side walls 2 and 3 are illustrated. This filter assembly 4 may be suspended upon a photographic printing apparatus by hook-shaped projections 5 extending from the sides of front wall 1 and also from the rear wall (not illustrated) upon the sides of an opening of proper size provided on the photographic printing apparatus. This assembly may be installed and removed by grasping handles 6 provided in front wall 1 and the unillustrated rear wall. A pair of shafts 7 are mounted parallel to side walls 2 and 3 between front wall 1 and the rear wall. Two sets of color filters I and II for two of the color components are mounted upon left-hand shaft 7, as shown in FIG. 1, and one set of filters III are mounted upon right-hand shaft 7. These three filter sets each incorporate, for example, three color filters of different density for each of the subtractive color components which are, for example cyan, magenta and yellow. Each of the filter elements is movably mounted and incorporates a partially transparent plate 8, a frame 9 of light construction, for example, made of metal, and a carrier plate 10 which is preferably made of sheet metal. A resilient means, for example provided by tension spring 11, is connected to each of the filters at pin 12 upon carrier plate 10, and it is connected at its other end by a bar 13 to rods 74 which are part of an energizing device which is later described in detail. The edge 14 of filter carrying plates 10 moves in contact about bar 13 when the filter is moved into and out of the path of the light rays as is later described in detail.

Two filter elements of each color component set are provided with similarly shaped locking projections I$a$ and I$b$, and the other is provided with a longer locking projection I$c$. These locking projections cooperate with the releasable locking means provided by sliding rods I$d$, II$d$ and III$d$ which are mounted to slide perpendicular to and across the planes of the filter elements by pin and slot connections 15 which fasten them to slide along side walls 2 and 3. Sliding control rods I$d$ and II$d$ are mounted upon opposite sides of side wall 2, and sliding bar III$d$ is mounted inside of side wall 3 in a position slightly lower than bars I$d$ and II$d$.

Control levers I$e$, II$e$ and III$e$ are provided for respectively controlling the positions of sliding bars I$d$, II$d$ and III$d$, and these levers are rotatably mounted upon common shaft 16 which is secured to the frame of filter assembly 4. Knobs 17 are installed upon the upper ends of levers I$e$, II$e$ and III$e$. As shown in FIG. 2, lower ends 18 of these levers are fork-shaped to engage pins 19 upon the sliding bars. Control lever III$e$ is, therefore, U-shaped and extends across filter assembly 4 below aperture 21 in its front wall 1. As is also shown in FIG. 2, the inner surfaces of the tines of the fork-shaped bottom end 18 of control lever I$e$ are outwardly tapered to facilitate the engagement of pin 19 within its opening.

The diagrammatic portion of FIG. 2 describes the various phases of operation of filter assembly 4. The seven operative positions of sliding bar I$d$ are illustrated, and each of these positions releases the combination of filter elements into the paths of the light rays having filter factors designated by the numbers applied to each lever position and to the side of each diagram. FIG. 2, therefore, illustrates that sliding bar I$d$ and also bars II$d$ and III$d$ are similarly provided with notches cut in a certain pattern. The primary portion of FIG. 2 shows the starting or neutral position for sliding bar I$d$ in which all three locking projections I$a$, $b$ and $c$ are engaged with solid portions of sliding bar I$d$. This permits the releasable locking means to prevent the movement of all of the filters of set I into the path of the printing light rays even if springs 11 are tensioned by an elongating movement of bars 13. This maintains the filters of set I in their starting position and allows the light rays of the color component which can be removed by set I to pass without restraint or diminishment through filter assembly 4.

When control lever I$e$ is positioned at the first marking designated by filter factor 15 to the left of its neutral position, projection I$a$ is released, thereby permitting the filter element having a density corresponding to a filter factor 15 to be rotated into the path of the light rays. In the next position of lever I$e$ designated by number 30, the medium density filter corresponding to a filter factor 30 is released. In the next position of lever I$e$ towards the left designated by filter factor 45, the first two filter elements are both released together to provide the combination of the first two filter factors 15 and 30 thereby a combined filter factor of 45. In the extreme left-hand position of lever I$e$, the other remaining filter element is released which has a filter factor of 60.

When lever I$e$ is moved towards the right, it successively releases combinations of filters as shown in the diagrammatic portion of FIG. 2 which respectively provide filter factors 90, 105 and 75 as designed by the numbers to the right of the various positions and the corresponding numbers designating successive right-hand positions of lever I$e$.

FIG. 3 shows a variation of the control lever shown in FIG. 2 in which an angular lever 23 is rotatably mounted upon a shaft 24 secured to the filter assembly. End 23$a$ of lever 23 is also fork-shaped to engage pin 19 of sliding bar I$d$. One end 25$a$ of torsion spring 25 reacts against end 23 whereas the other end 25$b$ of spring 25 reacts against cover plate 26 of the control device. Actuating buttons 27 act through cover plate 26 against the upward bias of springs (not shown). Buttons 27 incorporate locking recesses 27a and have wedge-shaped ends 27b which engage a sliding locking bar 29 which is mounted alongside end 23b of angular lever 23. A tension spring 30 secured to a stationary portion of the apparatus by pin 31 reacts to draw sliding rod 29 towards the right. When any of push buttons 27 are depressed, this urges slide 29 towards the left by the engagement of wedge-shaped end 27b with an opening 28. After the portion of sliding bar 29 adjacent opening 28 is engaged by a recess 27a in button 27, the button and slide are locked together. This shifts sliding bar 1d a variable amount in accordance with the distance of the button 27 which has been depressed from shaft 24. It is also apparent that one could use a T-shaped lever which is resiliently biased in both directions towards a central position instead of angular lever 23, and to provide buttons 27 upon both sides of shaft 24. However, this would require variation of the illustrated positions of notches 22 on sliding bar 1d.

FIG. 4 illustrates how a filter assembly 4 is mounted within a vertically disposed compartment 32 of a lamp casing 33 which is supported to slide upon a horizontal guide 34 of a printing apparatus housing 35 which is only partially illustrated. Lamp casing 33 incorporates a lamp 36, a concave mirror 37 and a condenser lens 38 mounted in front of filter assembly 4. On the other side of filter assembly 4 are mounted another condenser lens 39 and a reflecting mirror 40. Filter assembly 4 shown in FIG. 4 is of the electrically-operated type which is later described in detail. A switch assembly 41 also made in a unitary structure is detachably mounted upon the casing of printing apparatus 35. Also shown in FIG. 4 are male electrical connector 42 of filter assembly 4 and the cooperating female electrical connector 43 of lamp casing 33. A cable or plug (not shown) may be used for connecting the lamp casing to a source of electrical power upon the apparatus casing 35. FIG. 4 also shows a female electrical connector 44 upon apparatus casing 35 and a male electrical connector 45 of switch assembly 41 engaged therewith.

FIG. 4 also shows beneath its printing stage 46 two condenser lenses 47 and 48. Furthermore, a transparency 49 is shown in the projecting position in which it actuates rod 152 and switch contacts 149 to condition filter assembly 4 for operation. Under certain circumstances, it is also possible to mount the transparency in the printing position upon a separate casing. A telescopic light tube 50 is mounted above the printing stage, and its movable portion 50a is lowered before exposure closely about transparency 49.

Driving motor 51 for the entire printing apparatus drives the advance rolls for the printing material, a cutting device therefor and also one or more revolution counters all of which are not illustrated. Motor 51 also drives a means for energizing filter assembly 4 and its control arrangement through a sprocket and chain drive 52 which is connected to a clutch type coupling 53. Clutch 53 sets lever 55 into oscillation through a crank 54. Lever 55 is connected through a connecting link 56 and another lever 57 to a rod 58 in a conventional manner. Rod 58 is mounted to slide back and forth by means of pin and slot connections 59 upon the apparatus casing. As crank 54 turns, rod 58 is caused to slide upwardly and downwardly through clutch 53 when it is engaged. Crank 54 is accordingly not rotated continuously, but it is fixed in position during the exposure portion of the printing cycle because clutch 53 which is, for example electrically controlled, is disengaged at that time.

The linkage for driving rod 58 is constructed and arranged to move it into its lowermost position shortly before the exposure of the printing material is commenced. It is maintained in this lowermost position during the exposure process and returned once again to its upper position after completion of the exposure. Rod 58 forms part of a driving member for energizing movement of the color filter elements of filter assembly 4. Since filter assembly 4 is only connected with the printing assembly during the exposure portion of the cycle, lamp casing 33 may be at other times moved away from casing 35 of the printing apparatus to permit filter assembly 4 to be lifted out of it.

Figure 7:
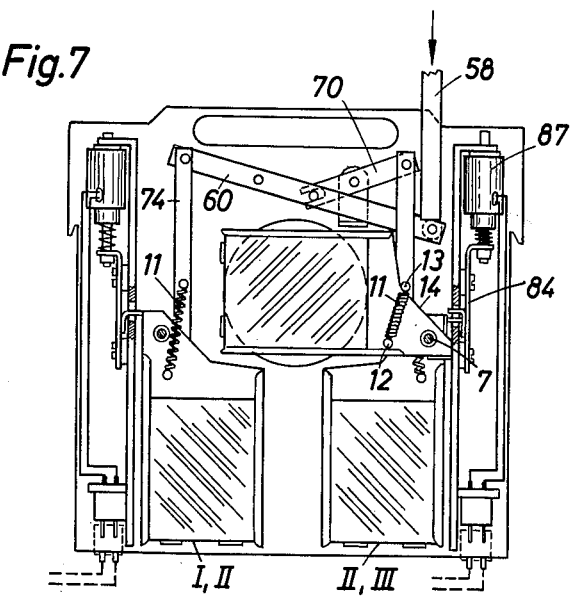

FIG. 5 shows in detail the mode of construction and action of the energizing means and the transmission from it to filter assembly 4 for energizing movement of the filter elements. FIGS. 6 and 7 in conjunction with FIG. 5 also illustrate the mode of action of an electrically-actuated embodiment of this invention.

In FIGS. 5-7 are shown levers 60 connected with each other by rods 61, 62 and 63, and these levers are rotatably mounted upon bearing pins 64 mounted in the front wall 1 and the rear wall (not shown). A tube 65 is mounted upon rod 61, for example, at its midpoint, and this tube may be made in the form of a simple bushing. The lower end 58a of energizing rod 58 contacts tube 65. Furthermore, a U-shaped brace 66 is rigidly connected by angles 67 and pins 68 with front wall 1 and the rear wall (not shown). The free ends 66a of U-shaped member 66 project upwardly and rotatably support through bearing pins 69 a pair of secondary levers 70. Ends 72 of secondary levers 70 are fork-shaped and engage rod 62 which connects lever 60. Secondary levers 70 are connected at their other end through a rotatable pin connection 73 to vertically disposed bars 74. Another set of vertically disposed rods 74 are also rotatably connected to the ends of rods 63. All four rods 74 are engaged by longitudinal slots 75 to slide about pins 76 secured to front wall 1 and the rear wall (not shown). Furthermore, tension springs 78 are connected to pins 77 at the bottom of rods 74 to resiliently draw them downwardly by virtue of the anchoring of the other ends of springs 78 upon bars 79 secured between side walls 2 and 3. Levers 60 and secondary levers 70 are constructed and arranged to transmit motion through them to vertically disposed rods 74 in approximately equal amounts. When energizing rod 58 moves downwardly, rods 74, which are also connected by the rods 13 discussed in conjunction with FIG. 1, move substantially uniformly upwardly. This carries any color filter elements which are not locked by the releasable locking means upwardly as a result of the tensioning of springs 11. Any filter elements which are moved upwardly have their edge 14 glide in contact about rods 13 as shown in FIG. 7. However, springs 11 of any color filter elements which are locked by the releasable locking means are merely stretched while their filter elements are maintained in the neutral condition shown in FIGS. 5 and 6.

In the electrically-actuated embodiment shown in FIGS. 5-7 the color filter elements have uniform physical configuration. Carrier plates 10 are therein provided with locking flanges instead of the locking projections of different size shown in FIG. 1. Locking projections 82 extend through openings 81 in side walls 2 and 3, and they are connected as shown in FIG. 11 to slide up and down upon side walls 2 and 3 by means of pin and slot connections 83 which mount sliding bars 84 upon side walls 2 and 3. As is also shown in FIG. 11, the bent upper end 85 of each sliding bar 84 is connected to armature 86 of electrically-controlled locking solenoid 87. A compression spring 88 reacts between solenoids 87 and bars 84 through bent ends 85 to urge these bars to move downwardly, and maintain locking projections 82 engaged in back of locking flanges 80 of the color filter elements. When each solenoid is energized, locking projections 82 are attracted and moved above the locking flanges of the filter elements. However, the color filter elements cannot leave their original lower positions until rod 58 moves downwardly to energize the resilient means to urge the filter elements towards the path of the light rays. Solenoids 87 are secured, for example, by nut and bolt connections 89 to brackets 90 upon side walls 2 and 3. The staggered arrangement shown in FIG. 11 of sliding bars 84 and solenoids 87 provides a compact structure of these elements and facilitates their electrical connection.

The lower ends of locking bars 84 include holes 91 through which wires 92 are connected. The lower ends 93 of these wires are bent upwardly and protrude through holes 94 within a common switching bar 95. These wires are accordingly connected to pull bar 95 upwardly with them, but they disengage from the bar when they move downwardly to allow bar 95 to be held up if any of bars 84 remains in the "up" position. A plate 96 is rotatably connected to a switching block 98 made of insulating material. Plate 96 is rigidly connected with switching bar 95 to rotate it about shaft 97 secured to block 98 in response to its movement. A switch 99 is mounted upon block 98 and includes a pair of contacts. When any solenoid 87 is energized and draws its armature 86, sliding bars 84 and wire 92 towards it, bar 95 and plate 96 are also raised which closes switch contacts 99. These contacts can therefore be used to control a signaling device such as a lamp 100 shown upon switching assembly 41 of FIG. 8 to indicate when any of the releasable locking elements or the filter elements associated therewith are not in the proper starting condition in which the filter elements are outside of the path of the light rays.

In FIG. 8 is shown a switching assembly 41 including, for example, three rows of push buttons A, B and C for actuating the movement of the color filters for each color component. Another row of push buttons D is provided for controlling an automatic exposure control device or for controlling supplemental light. Toggle switch 101 is provided for switching from single or multiple exposure. Push button 103 is provided for causing multiple exposures of several sheets of printing material by the same transparency.

As shown in FIG. 10, each push button switch incorporates a U-shaped frame 104 which is rigidly mounted upon the casing of the switching assembly. An upwardly extending shaft 106 is mounted upon the lower flange 105 of frame 104, and the upper flange 107 of frame 104 incorporates a hole 108. Push button 109 is primarily formed by a rectangularly-shaped knob or head 110 whose top is covered by a transparent disc 111. Shaft 112 protrudes upwardly through hole 108, and a bushing 113 is connected to the upper end of the shaft 106. A lateral switching projection 114 extends from bushing 113 for controlling the actuation of the various contacts associated with each push button. A compression spring 115 reacts between bushing 113 and lower flange 105 to maintain the push button urged towards its upper position. A locking pawl 117 is rotatably connected through pin 116 to the vertical portion of frame 104. This locking pawl is also rotatably connected through a pin 118 to a locking bar 119. A leaf spring 120 urges locking pawl 117 to turn counterclockwise as shown in FIG. 10.

In the unlocked condition of each switch a pin 121 mounted upon bushing 113 lies above hook 122 at the upper end of pawl 117. When push button 109 is depressed, locking pawl 117 is first forced to rotate in a clockwise direction against the resilient bias of leaf spring 120. This actuates locking bar 119 to move to the right thereby unlocking any push buttons which may have previously been depressed. When the push button has been completely depressed, locking hook 122 engages pin 121 and secures the push button in the depressed position. This mode of operation indicates that one or more push buttons can be simultaneously depressed.

Each locking bar 119 for the various rows of push buttons incorporates an elongated slot 123 within which is inserted a transverse rod 124 shown in FIG. 9. The armature of a release solenoid 125 mounted within the switching assembly is connected through fork 126 to transverse rod 124. A compression spring 127 reacts against fork 126 in a direction opposite to that applied by solenoid 125. Also as shown in FIG. 8, a locking bar for push button row D is also connected with transverse rod 124 through a U-shaped strap 128 and a rod 129 disposed parallel to rod 124.

Figure 12:
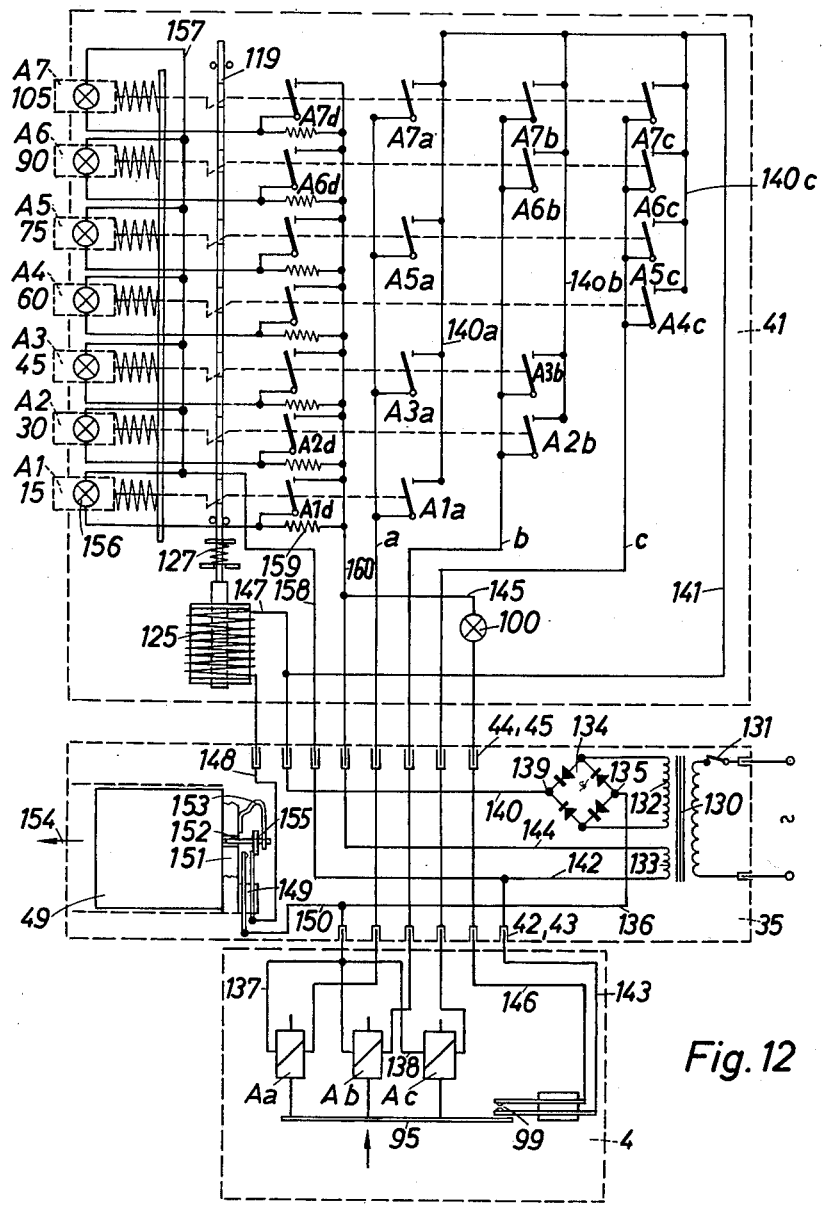
FIG. 12 is a schematic electrical diagram of portions of an electrically-controlled embodiment of this invention required for each color component.

To simplify this presentation, the schematic electrical diagram shown in FIG. 12 only includes the three solenoids which operate the color filter elements for one color component. The connections for each of the other color components which are not illustrated are similarly arranged. The control of one set of filter elements for a single color component is accomplished through solenoids $Aa$, $Ab$ and $Ac$ through push buttons A1 through A7. A transformer 130 is mounted within the case of the apparatus, and it is connected through a switch 131 with an alternating current source of potential. Transformer 130 includes two secondary coils 132 and 133, and coil 132 is connected to full-wave rectifier 134. The first output terminal 135 of rectifier 134 is directly connected with solenoids $Aa$, $Ab$ and $Ac$ through electrical lead 136 and branching leads 137 and 138. From the other terminal 139 of rectifier 134 leads 140 and 141 are connected through branching leads $140a$, $140b$ and $140c$ to one side of contacts $A1a$ to $A7c$. The other side of contacts $A1a$, $A3a$, $A5a$ and $A7a$ is connected through a line "$a$" with solenoid $Aa$. The other side of contacts $A2b$, $A3b$, $A6b$ and $A7b$ is connected through a line "$b$" with solenoid $Ab$, and the other side of contacts $A4c$, $A5c$, $A6c$ and $A7c$ is connected through line "$c$" with solenoid $Ac$. Electrical sockets and connectors 42, 43, 44 and 45 do not interrupt the circuit since they remain connected as long as engaged.

When push button A1 is depressed, only solenoid $Aa$ responds to release a filter element having a filter density 15 as designated by number 15 along side push button A1. Push button A3 controls two filter elements having densities 15 and 30 to comprise the density 45 indicated alongside push button A3. Push button A7 controls all three filters having a total density of 105, and the other push buttons are connected as described to control the release of one or more filter elements having respective density factors of 15, 30 and 60 to provide the factors indicated alongside each of them. Solenoid $Aa$ controls a filter element having a density of 15. Solenoid $Ab$ controls a filter element of density 30, and solenoid $Ac$ controls a filter element of density 60.

Secondary coil 133 of transformer 130 is connected through leads 142 and 143 with switch 99 which is controlled by bar 95 connected to solenoids $Aa$, $Ab$, and $Ac$. The other side of solenoid coil 133 is connected through leads 144 and 145, to lamp 100 which is in turn connected to the other side of switch 99 through a lead 146. As a rule, another switch (not shown) is connected in this circuit, and this switch is actuated by the transmission linkage 60—77 shown in FIG. 5 to deenergize this circuit when linkage 60—77 is in the actuated condition. Lamp 100 thereby indicates that a portion of the releasable locking means has not returned to its initial position when the apparatus is in the starting condition.

One side of release solenoid 125 for the switching assembly is connected through lead 147 with line 140, and its other side is connected through line 148 with switch 149 which is also connected to line 136 via connecting lead 150. Switch 149 is normally closed. A pin 152 is mounted upon a ledge 151 disposed adjacent the printing stage, and a U-shaped spring 153 reacts upon pin 152 to cause it to protrude into the space to be occupied by a transparency 49 when it is positioned for projection. Pin 152 is, therefore, forced back by the transparency against the resilient action of spring 153 as soon as it is inserted in the printing position to open switch 149. When transparency 49 is removed in the direction of arrow 154, pin 152 closes switch 149 through plate 155. This closes the circuit to energize solenoid 125 which pulls locking slide 119 through rod 124, as shown in FIGS. 9 and 12 to unlock all of the push buttons. These push buttons can, therefore, not be maintained depressed unless a transparency is disposed in the printing position. Solenoid 125 can be made strong enough to be continuously energized, or it can also be made weaker if only surges of current are provided to it through a condenser when switch 149 is closed.

An indicating lamp 156 is installed in the head of each push button A1—A7 and one side of these lamps is connected through leads 157 and 158 with line 142 and thereby directly to secondary coil 133. The other side of lamps 156 is connected through resistors 159 and line 160 to the other terminal of secondary coil 133. Switch contacts A1d–A7d are connected in shunt about resistors 159. Before each push button is depressed, contacts A1d–A7d are open, and the lamps therefore glow just brightly enough to make the numbers upon the heads of the push buttons visible even in a completely dark room. When each push button is depressed, this closes the bypassing contacts A1d–A7d associated with it to bypass the resistor 159 in its circuit thereby permitting the full voltage from secondary coil 133 to be applied to the lamp. This makes the head of the depressed push button glow more brightly than the others thereby permitting one to ascertain at a glance which push buttons are depressed and accordingly which filter elements are being utilized.

What is claimed is:

1. A filter-operating arrangement for a photographic printing apparatus incorporating sets of color filter elements of varying density for each color component which are movably mounted for selective insertion into the path of the printing light, said arrangement comprising resilient means reacting upon said filter elements in a direction to insert them into said path of the rays of printing light, releasable locking means operatively connected to engage said filter elements for preventing the movement of said filter elements into said path of the printing light and maintaining them disposed outside of it, said releasable locking means being arranged for selectively controlling the release of predetermined combinations of said filter components of each set, combined energizing means connected to all of the resilient means of each set of filter components for simultaneously tensioning them to thereby react upon said components in a direction of insertion into said path of the printing light during a predetermined portion of the cycle of operation of said photographic printing apparatus and manually-actuable means operatively connected to said releasable locking means for selectively disengaging said releasable locking means from said filter elements to control their release in said predetermined combinations in accordance with the desired combined filter density inserted into the path of said printing light into said path of the printing light.

2. An arrangement as set forth in claim 1 wherein said releasable locking means is arranged for releasing preselectable combinations of said filter elements to interpose them into said path of the printing light in predetermined combinations including at least one of said filter elements.

3. An arrangement as set forth in claim 2 wherein said releasable locking means comprises a movable rod which is cut out in a pattern for cooperatively engaging said different combinations of said filter elements in different relative disposition, and slide means mounting said bar for movement across the planes of movement of said filter elements for selectively controlling their locking and release in said predetermined combinations.

4. An arrangement as set forth in claim 3 wherein said color filter elements of variable density for the same color component are provided with locking projections of varying length for engaging said releasable locking means, said rod incorporating recesses of varying depth, and said recesses of varying depth cooperating with said projections of varying length for controlling the selective release of said color filters.

5. An arrangement as set forth in claim 3 wherein a manually-adjustable lever is connected with said rod for controlling its movement to positions which control the selective release of said filter elements in said predetermined combinations.

6. An arrangement as set forth in claim 5 wherein push buttons are operatively engageable with said lever for actuating its movement.

7. An arrangement as set forth in claim 1 wherein a drive means is provided in said arrangement and a transmission connects said drive means with said combined energizing means.

8. An arrangement as set forth in claim 7 wherein said transmission includes a clutch for selectively engaging said energizing means with said drive means.

9. An arrangement as set forth in claim 7 wherein said combined energizing means includes a bar, said resilient means including springs having one end connected to each of said filter elements, the other end of said springs of the filter elements of each color component being connected to a single one of said bars, said bar being mounted in a movable linkage, and a drive means being operatively connected to said linkage for moving it in a direction to tension said springs during said predetermined portion of said cycle of operation of said photographic printing apparatus whereby said filters are conditioned for insertion into the path of said printing light upon selective actuation of said releasable locking means.

10. An arrangement as set forth in claim 1 wherein an electrically-controlled means is operatively connected to actuate said releasable locking means thereby permitting the movement of said filters to be remotely actuated.

11. An arrangement as set forth in claim 10 wherein said electrically-controlled means incorporates solenoids connected to said releasable locking means.

12. An arrangement as set forth in claim 10 wherein a selective switching assembly is connected with said electrically-controlled means for selectively releasing said filter elements one at a time and in combinations.

13. An arrangement as set forth in claim 12 wherein said switching means comprises push button switches having multiple contacts.

14. An arrangement as set forth in claim 13 wherein said switches for controlling the release of said filter elements of each color component are connected by a linkage which releases all of said switches for said component except the last ones actuated.

15. An arrangement as set forth in claim 14 wherein a single release element is connected with each of said linkages for all of said filter elements for actuating the simultaneous release of all of said switches.

16. An arrangement as set forth in claim 15 wherein said release element is electrically actuated.

17. An arrangement as set forth in claim 16 wherein an automatic switch for controlling said electrically-actuated release element includes an actuating projection disposed in the path of a transparency disposed in the printing position and said actuating projection operating said automatic switch to release said switches unless a transparency is in said printing position.

18. An arrangement as set forth in claim 13 wherein an indicating lamp is provided upon each of said push button switches, said indicating lamps being connected through a series-connected resistor to a source of potential, and a contact means operated by said push button and being connected to shunt said series-connected resistor for causing said indicating lamp to glow more brightly when the push button upon which it is mounted is depressed.

19. An arrangement as set forth in claim 1 wherein a number of warning switches are connected in parallel with each other and operatively connected to be actuated by said releasable locking means, and said parallel-connected warning switches being connected in a circuit with a warning signal device in a manner which energizes it if any portion of said releasable locking means is not in condition for maintaining its associated filter element in said position outside of the path of the printing light.

20. An arrangement as set forth in claim 19 wherein a single warning switch is provided for several portions of said releasable locking means, and a linkage connects said switch with said several portions for actuating it if any one of said portions is not in said condition for maintaining its filter element out of said path of the printing light.

References Cited in the file of this patent

UNITED STATES PATENTS

| | | |
|---|---|---|
| 1,170,621 | Foulds et al. | Feb. 8, 1916 |
| 2,557,182 | Forgett | June 19, 1951 |
| 2,660,926 | Talley | Dec. 1, 1953 |
| 2,794,365 | Baasner et al. | June 4, 1957 |
| 2,822,729 | Capatosto | Feb. 11, 1958 |
| 2,841,065 | Gage et al. | July 1, 1958 |

FOREIGN PATENTS

| | | |
|---|---|---|
| 847,244 | Germany | Aug. 21, 1952 |